United States Patent
Brooks et al.

(10) Patent No.: US 11,348,460 B2
(45) Date of Patent: May 31, 2022

(54) VEHICLE INTELLIGENT PROCESSING AND PRESENTATION OF WIRELESS EMERGENCY ALERTS

(71) Applicant: T-Mobile USA, Inc., Bellevue, WA (US)

(72) Inventors: Terri L. Brooks, Prosper, TX (US); Precia Carraway, Tukwila, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/005,764

(22) Filed: Aug. 28, 2020

(65) Prior Publication Data

US 2022/0068130 A1    Mar. 3, 2022

(51) Int. Cl.
*G08G 1/0967* (2006.01)
*G08G 1/0969* (2006.01)
*H04W 4/90* (2018.01)

(52) U.S. Cl.
CPC ..... *G08G 1/096716* (2013.01); *G08G 1/0967* (2013.01); *G08G 1/0969* (2013.01); *G08G 1/096791* (2013.01); *H04W 4/90* (2018.02)

(58) Field of Classification Search
CPC ...... G08G 1/00; G08G 1/01; G08G 1/096716; G08G 1/096775; G08G 1/096791; G08G 1/16; G08G 1/161; G08G 1/165; G08G 1/166; G08G 1/167; B60Q 9/00
See application file for complete search history.

(56) References Cited

U.S. PATENT DOCUMENTS

| | | | |
|---|---|---|---|
| 7,479,901 B2 * | 1/2009 | Horstemeyer | G08G 1/205 340/994 |
| 8,989,699 B2 | 3/2015 | Hatton | |
| 9,656,606 B1 * | 5/2017 | Vose | G05D 1/0278 |
| 9,841,767 B1 * | 12/2017 | Hayward | G01C 21/367 |
| 10,417,914 B1 * | 9/2019 | Vose | G08G 1/123 |
| 2007/0139182 A1 | 6/2007 | O'Connor | |
| 2009/0325538 A1 | 12/2009 | Sennett | |
| 2015/0323326 A1 * | 11/2015 | Aravind | G08G 1/123 340/989 |
| 2018/0367958 A1 * | 12/2018 | Dizdarevic | G08G 1/091 |
| 2020/0327804 A1 * | 10/2020 | Xu | G08G 1/096811 |

* cited by examiner

*Primary Examiner* — Van T Trieu
(74) *Attorney, Agent, or Firm* — Loeb & Loeb LLP

(57) ABSTRACT

A computer-implemented method of receiving and processing a wireless emergency alert at a vehicle comprises receiving, at a computer system of the vehicle, the wireless emergency alert over a wireless communication network. The wireless emergency alert may include an alert message and geographical coordinates defining one or more alert areas associated with the emergency alert. The method may further include comparing, via the vehicle computer system, a current location of the vehicle with the geographical coordinates to determine whether the vehicle is within or near the alert area(s) and, if the vehicle is within or near the alert area(s), generating via the computer system a map illustrating the current location of the vehicle with respect to the alert area(s), and displaying the map at a display screen of the vehicle.

18 Claims, 11 Drawing Sheets

VEHICLE INTELLIGENT PROCESSING AND PRESENTATION OF WIRELESS EMERGENCY ALERTS

TECHNICAL FIELD

Embodiments discussed herein generally relate to methods and systems for intelligent processing and presentation of wireless emergency alerts at vehicles via vehicle computer systems.

BACKGROUND

The wireless emergency alert system is an alerting system designed to broadcast wireless emergency alerts (WEAs) from an alert originator to wireless devices over wireless communication networks. These alerts may inform the device users of various types of alerts including presidential alerts, alerts involving imminent threats to safety or life (e.g., fires, floods, hurricanes, tornadoes, earthquakes, etc.), and child abduction (e.g., AMBER) alerts. The alerts may be broadcast to device users according to standards based on requirements set forth by the Federal Communications Commission (FCC). Current WEA 2.0 and WEA 3.0 standards limit the alert text to 360 alphanumeric characters. The device user may be provided an interface to establish settings to enable or disable the presentation of certain types of WEA alerts, and to select a preferred language (e.g., English or Spanish).

The alert originator may choose to define the alert area(s) using geographical coordinates. In WEA 2.0 broadcasts, all mobile devices located within cells or cell sectors that touch or overlap with the alert area(s) present the alert to the device user, even if the device itself is outside of the actual boundaries of the alert area(s). The geographical coordinates defining the alert boundaries are kept within the network in WEA 2.0 and are not communicated to the mobile devices. In networks updated to WEA 3.0, the alert broadcast includes both the alert message and the geographical coordinates defining one or more geometric shapes that describe the boundaries of the alert area(s). Current regulations limit the alert area to 10 geometric shapes (circle, polygon) with 1 to 100 total coordinates for all shapes. WEA 3.0 capable mobile devices may apply device-based geo-fencing to tighten the alert presentation to just those mobile devices located within the boundaries of the alert area(s) defined by the alert coordinates, taking into account a 0.1 mile overshoot. WEA 3.0 capable mobile devices are able to receive the coordinates defining the geometric shape of the alert area(s) and compare their location against the alert area(s) to determine whether or not the device is within the alert area(s) and should present the alert. The alert is presented at the mobile device through tactile (vibration cadence), visual (display), and audible (alert tones) means.

While effective, there is a need for expanding the types of systems that are capable of receiving, processing, and presenting wireless emergency alerts. Furthermore, there is a need for providing additional information to device users located near or in an alert area(s) that will assist in avoiding danger and enhancing safety. The embodiments of the present disclosure attempt to provide a technical solution to address these needs.

SUMMARY

Embodiments disclosed herein apply to systems and methods for intelligent processing and presentation of wireless emergency alerts at vehicle computer systems without a need to connect the vehicle to a separate mobile device. In one embodiment, a computer-implemented method of processing and presenting a wireless emergency alert at a vehicle is disclosed. The method may include receiving, at a computer system of the vehicle, the wireless emergency alert over a wireless communication network. The wireless emergency alert may include an alert message and geographical coordinates defining one or more alert areas associated with the wireless emergency alert. The method may further include comparing, via the vehicle computer system, a current location of the vehicle with the geographical coordinates to determine whether the vehicle is within or near the alert area(s) defined by the geographical coordinates. If the vehicle is within or near the alert area(s), the method may further include generating, via the computer system, a map that illustrates the current location of the vehicle with respect to the alert area(s), and displaying the map at a display screen of the vehicle.

In one aspect, the method may also include providing additional assistance, such as instructions for the shortest driving route to exit or avoid the alert area(s), or the safest driving route between the current location of the vehicle and a desired destination. The method may include providing driving instructions for staying out of the alert area(s) if the vehicle is within a predetermined distance (e.g., 0.1 mile) of an outer boundary of the alert area(s).

In another embodiment, a system for processing and presenting a wireless emergency alert at a vehicle is disclosed. The system may include a wireless communication network configured to broadcast the wireless emergency alert. The wireless emergency alert may include an alert message and geographical coordinates defining one or more alert areas associated with the wireless emergency alert. The system may further include a computer system of the vehicle including a processor, a memory, and a communication circuit in communication with the wireless communication network. The processor may be configured according to computer-executable instructions for autonomously receiving the wireless emergency alert over the wireless communication network, and comparing a current location of the vehicle with the geographic coordinates to determine whether the vehicle is within or near the alert area(s) defined by the geographical coordinates. If the vehicle is within or near the alert area(s), the processor may be further configured according to computer-executable instructions for generating a map illustrating the current location of the vehicle with respect to the alert area(s), and displaying the map at a display screen of the vehicle.

In one aspect, the processor may be further configured according to computer-executable instructions for providing additional assistance, such as instructions for the shortest route to exit or avoid the alert area(s), or the safest route between the current location of the vehicle and a desired destination. The processor may be configured according to computer-executable instructions for providing instructions for staying out of the alert area(s) if the vehicle is within a predetermined distance (e.g., 0.1 mile) of the alert area(s).

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

DETAILED DESCRIPTION

Figure 1:
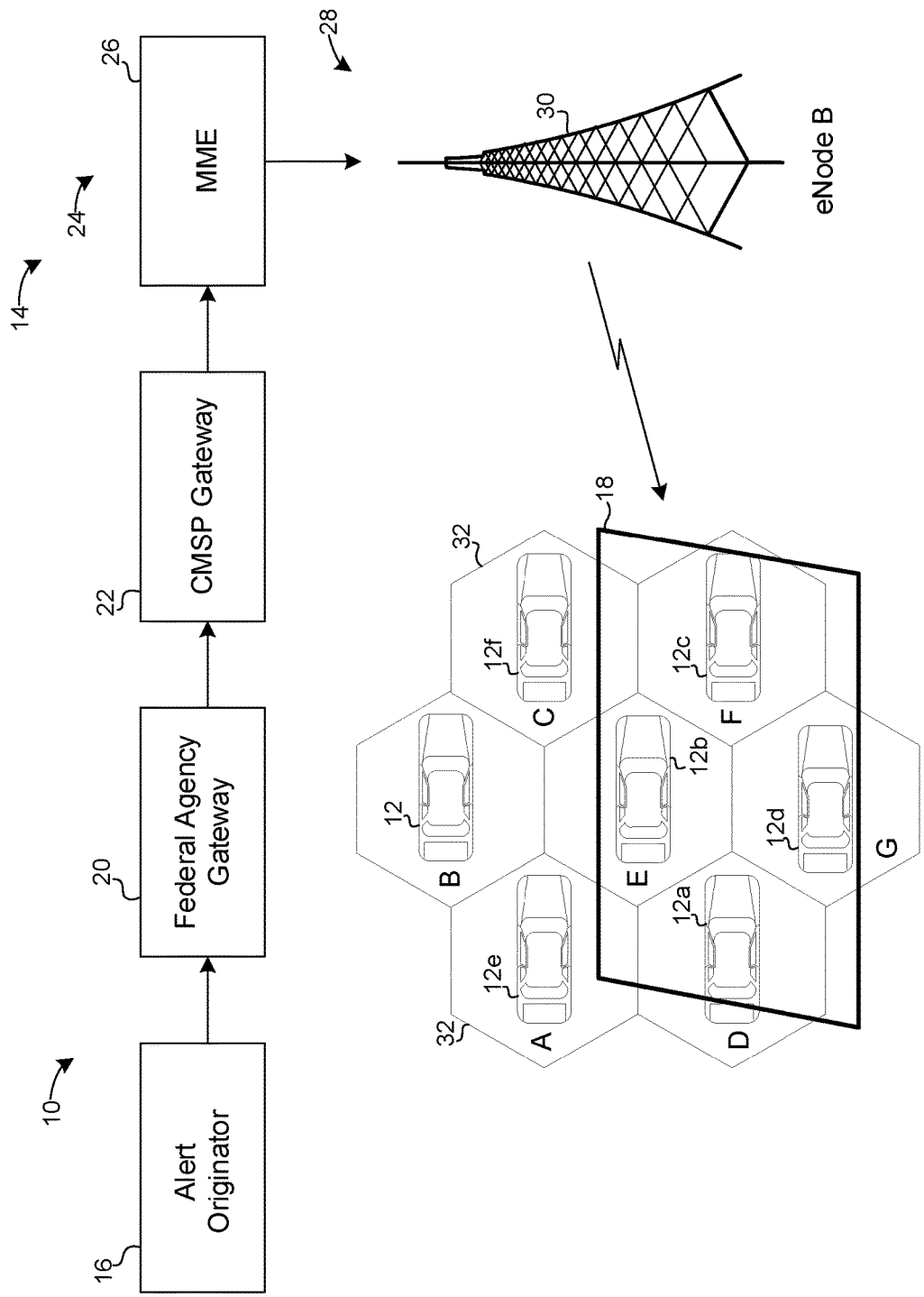
FIG. 1 is a schematic representation of a system for communicating wireless emergency alerts to vehicles, according to one embodiment.

Referring now to the drawings and with specific reference to FIG. 1, a system 10 for broadcasting a wireless emergency alert (WEA) directly to vehicles 12 is shown. The vehicles 12 may be capable of independently receiving the WEA broadcast, processing the broadcast, and presenting the alert to the driver and/or passengers without connection to a separate mobile device (e.g., smartphone, tablet, etc.). In some embodiments, the vehicles 12 may operate as stand-alone mobile devices on their own mobile device plan. The vehicles 12 may offer advantages over hand-held mobile devices including a larger display screen for presenting alerts to drivers and passengers, mapping or navigation functions for providing visuals or directions to safety via the display screen, and audio capabilities for presenting alerts or directing the vehicle to safety. More specific details describing intelligent processing and presentation of the WEA at the vehicle to provide safety features such as mapping features, visuals, and directions to safety will be provided below.

The system 10 may include a wireless communication network 14, and the vehicles 12 capable of independently receiving and transmitting data over the wireless communication network 14 without connection to a separate mobile device. The vehicles 12 may be WEA 3.0 capable, meaning that the vehicles 12 may be capable of both receiving geographical coordinates describing one or more alert areas associated with the wireless emergency alert, and applying device-based geo-fencing to compare their location against the alert area(s) to determine if the alert should be presented at the respective vehicle 12. The alert may be presented as a visual (e.g., text, etc.) alert at a display screen of the vehicle 12, or as an audible sound or verbal (voice) alert via an audio system of the vehicle 12.

The WEA broadcast may originate from any authorized alert originator 16 such as the National Weather Service (NWS) or United States Geological Survey (USGS), or federal, state, or local agency. The alert may include a presidential alert, an alert regarding imminent threats to safety or life (e.g., fires, wildfires, floods, hurricanes, earthquakes, natural disasters, etc.), a child abduction (e.g., AMBER) alert, and public safety alerts, for example. The broadcast may be a WEA 3.0 broadcast and will include at least the alert message, which may be limited to a specific number of alphanumeric characters (e.g., 360 characters), and may include geographical coordinates defining one or more geometric shapes (e.g., circle or polygon) describing the geographical boundaries of one or more alert areas 18 associated with the wireless emergency alert. The alert area(s) 18 may be defined as any geometric shape including circular and polygonal shapes. In some embodiments, the geometric shape of the alert area(s) 18 may be limited to 10 geometric shapes with 1 to 100 total coordinates for all shapes, although this limit may vary depending on changing WEA regulations.

The WEA may be sent from the alert originator 16 to the federal agency gateway 20 (e.g., a federal alert gateway) and to a commercial mobile service provider (CMSP) gateway 22 before entering the carrier's wireless communication network 14. The wireless communication network 14 may be a 4G long-term evolution (LTE) network 24, or a 5G network. If the wireless communication network 14 is a 4G LTE network 24, it may include, among other components and entities, a mobility management entity (MME) 26, and a radio access network (RAN) 28 including radio base stations (eNode Bs) 30. If the wireless communication network is a 5G network, the nomenclature of the network entities may vary somewhat, as will be understood by those skilled in the art.

The WEA may be broadcast over the air via the radio base stations 30 to the vehicles 12 in (full) cells 32 or selected cell sectors of cells 32 that touch or overlap with the alert area(s) 18, depending on how the system 10 builds their broadcast area for the wireless emergency alert. In the simplified representation of FIG. 1, the WEA may be broadcast to the vehicles 12 in selected cell sectors of cells A, C, D, E, F, and G, but not to the vehicle 12 in cell B because cell B does not touch or overlap with the alert area 18. In other embodiments, the WEA may be broadcast to all vehicles 12 in (full) cells A, C, D, E, F, and G that touch or overlap with the alert area(s) 18.

Each of the vehicles 12 in cells A, C, D, E, F, and G (or selected cell sectors of cells A, C, D, E, F, and G) that receive the WEA broadcast may apply device-based geo-fencing to determine whether or not the respective vehicle 12 is within the alert area(s) 18 or within a predetermined distance (e.g., 0.1 mile) of an outer boundary of the alert area(s) 18 according to the geographical coordinates received in the broadcast. More specifically, each vehicle 12 may query its location using location features such as, but not limited to, a global positioning system (GPS), Bluetooth beacons, and triangulation features. If the vehicle 12 is within the alert area(s) 18 or within a predetermined distance of the alert area(s) 18, the vehicle 12 may present the alert, as explained more specifically below. In the exemplary representation of FIG. 1, vehicles 12a-12d would present the alert because they are located within the boundaries of the alert area(s) 18, whereas vehicles 12e-12f would not present the alert because they are located outside of the boundaries of the alert area(s) 18. In other arrangements, the vehicles 12 in cells or selected cell sectors of cells A, C, D, E, F, and G overlapping the alert area 18 may default to presenting the wireless emergency alert, such as when device-based geo-fencing is bypassed to accelerate the dissemination of the alert, or when the location features on the vehicle 12 are turned off or functioning poorly.

Figure 2:
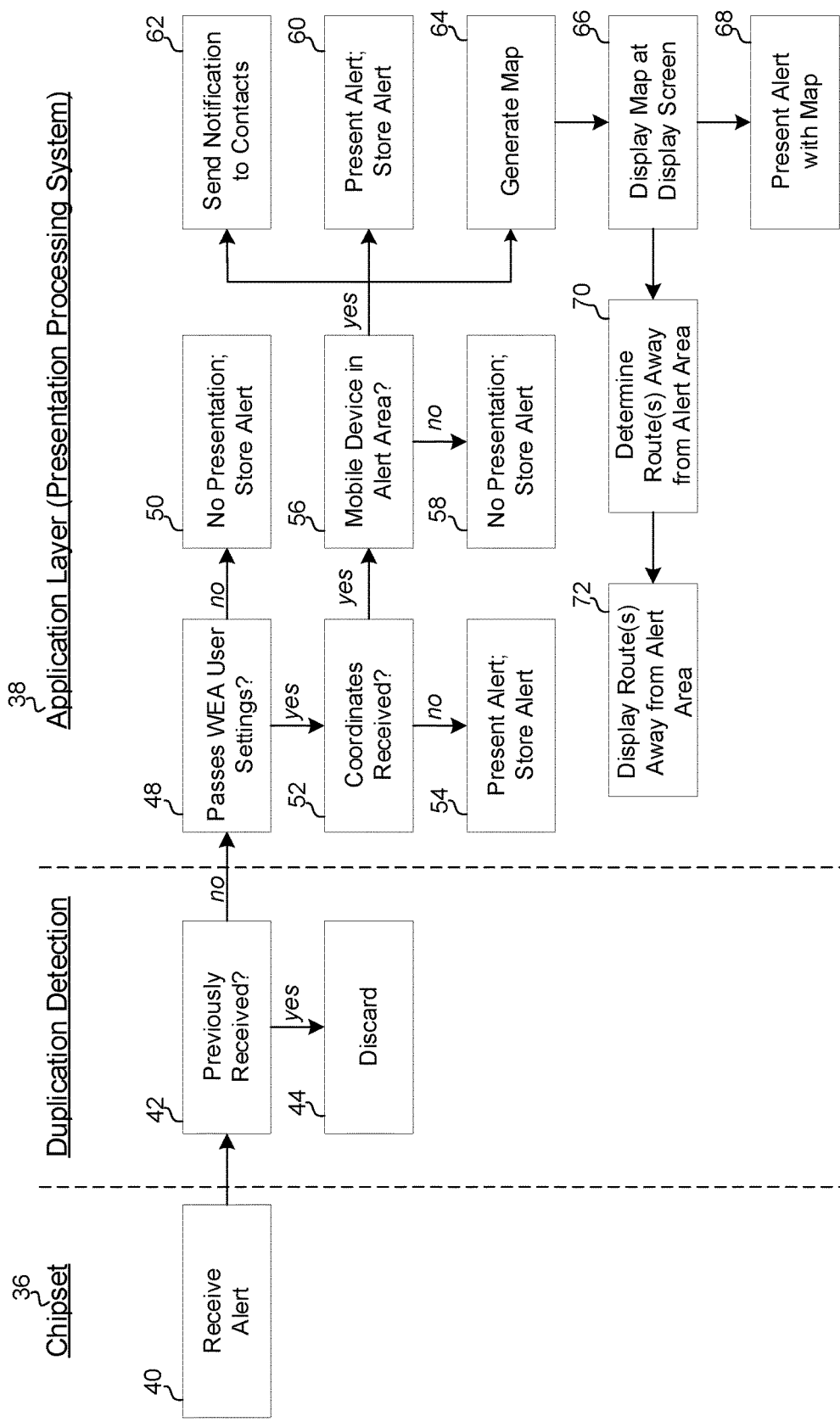
FIG. 2 is a flow chart illustrating an exemplary computer-implemented method for processing and presenting a wireless emergency alert at a vehicle, according to one embodiment.

Turning to FIG. 2, an exemplary method for processing and presenting the WEA at a vehicle 12 is shown. The method may be performed by a computer system 34 of the vehicle 12 (also see FIG. 3). Similar to a hand-held mobile device, such as a smartphone, the computer system 34 may have its own dedicated chipset 36 and application layer 38 that are involved in receiving and reading the WEA broadcast, processing the WEA broadcast, and presenting the alert (also see FIG. 3). The WEA broadcast may be pulled into and received at the chipset 36 at a block 40 before duplication detection is performed at blocks 42 and 44. If the WEA broadcast was previously received as determined at the block 42, the WEA broadcast may be discarded at a block 44. If the WEA broadcast was not previously received, the WEA broadcast may be passed to the application layer 38 including a presentation processing system 46 for further processing (also see FIG. 3).

At a block 48, the presentation processing system 46 may determine whether the broadcast complies with WEA user setting checks. For example, the mobile device user may have disabled or opted out of certain types of alerts. If the WEA broadcast does not pass the user setting checks, then the alert will not be presented and will be stored for recall by the driver or other user of the vehicle if desired (block 50). If the WEA broadcast passes the user setting checks, the presentation processing system 46 may determine if the geographical coordinates were received in the broadcast (block 52). If the coordinates were not received in the broadcast, the system 46 may default to presenting the alert and storing the alert according to a block 54. If the coordinates were received, the system 46 may apply the coordinates to internally construct the alert area(s) 18, and compare the current location of the vehicle 12 with the alert area(s) 18 to determine if the vehicle 12 is within the alert area(s) 18 or within a predetermined distance (e.g., 0.1 miles) of the alert area(s) 18 (block 56). If not within or near (within a predetermined distance of) the alert area(s) 18, the alert is stored and not presented (block 58). If the vehicle 12 is within the alert area(s) 18 or within the predetermined distance of the alert area(s) 18, the alert may be presented and stored (block 60). The alert may be presented as a visual/text alert at a display screen of the vehicle 12, as an audible sound alert, and/or as an audible verbal alert via the audio system of the vehicle 12. In some embodiments, the system 46 may present the alert at least as an audible sound or verbal alert if the vehicle is in driving mode, so that the driver does not need to look at the display screen while driving. Additionally, in some embodiments, the vehicle computer system 34 may send a notification over the wireless communication network 14 to devices of selected contacts to notify the contacts that the vehicle driver is in an alert area and may be in danger (block 62).

When the coordinates are received, the vehicle computer system 34 may apply a mapping application or other mapping functions and the location features of the vehicle 12 to generate a map that illustrates the current location of the vehicle 12 with respect to the alert area(s) 18 (block 64). In some embodiments, the block 64 may involve constructing a first map of the alert area(s) 18 based on the coordinates, and merging the first map with a second map of the current location of the vehicle 12. The map may indicate a driving direction of the vehicle 12, allowing the driver to see if he or she is headed away from or deeper into the alert area(s) 18. The map may be displayed at a display screen of the vehicle 12 so that the map is viewable by a driver of the vehicle 12 (block 66). In some embodiments, the map may override a current display at the display screen. In other embodiments, the driver may have an option to view the map by making a selection at the display screen, or by making a verbal command. In some embodiments, the location of the vehicle 12 with respect to the alert area(s) 18 may be updated periodically or in real time on the map as the vehicle 12 and/or the alert area(s) change locations.

The alert may be presented along with the map at the display screen as a visual/text alert (block 68). Alternatively, or additionally, an audible sound alert or an audible verbal alert may be presented when the map is displayed (block 68). In other arrangements, the alert may be presented separately from the map, and the driver may have a selection to view the map at the display screen or may make a verbal command to view the map when the alert is presented.

The vehicle computer system 34 may further apply the mapping application (or other mapping functions) and the vehicle navigation system to determine one or more driving routes for the vehicle 12 to get away from the alert area(s) 18 and out of danger in a safe and/or quick manner (block 70), or to reach a particular destination using a route which avoids the active alert area(s). The one or more driving routes may be visually displayed at the display screen as arrows on the map, and/or as a text description along with or separately from the map (block 72). Alternatively, or in addition to this, the one or more routes to safety may be provided as an audible verbal description to assist the driver in getting to safety without having to look at the display screen, and assisting in what may be a time of panic. The presentation processing system 46 may choose the safest and/or shortest route(s) to provide to the driver. In other embodiments, the system 46 may rank the routes according to safety and/or quickness, and the driver may select the safest and/or shortest route according to their preference. It will be understood that the steps of FIG. 2 are exemplary and may include fewer or additional steps, may be performed in a different order, or may be implemented in other ways by the vehicle computer system 34 in practice.

Figure 3:
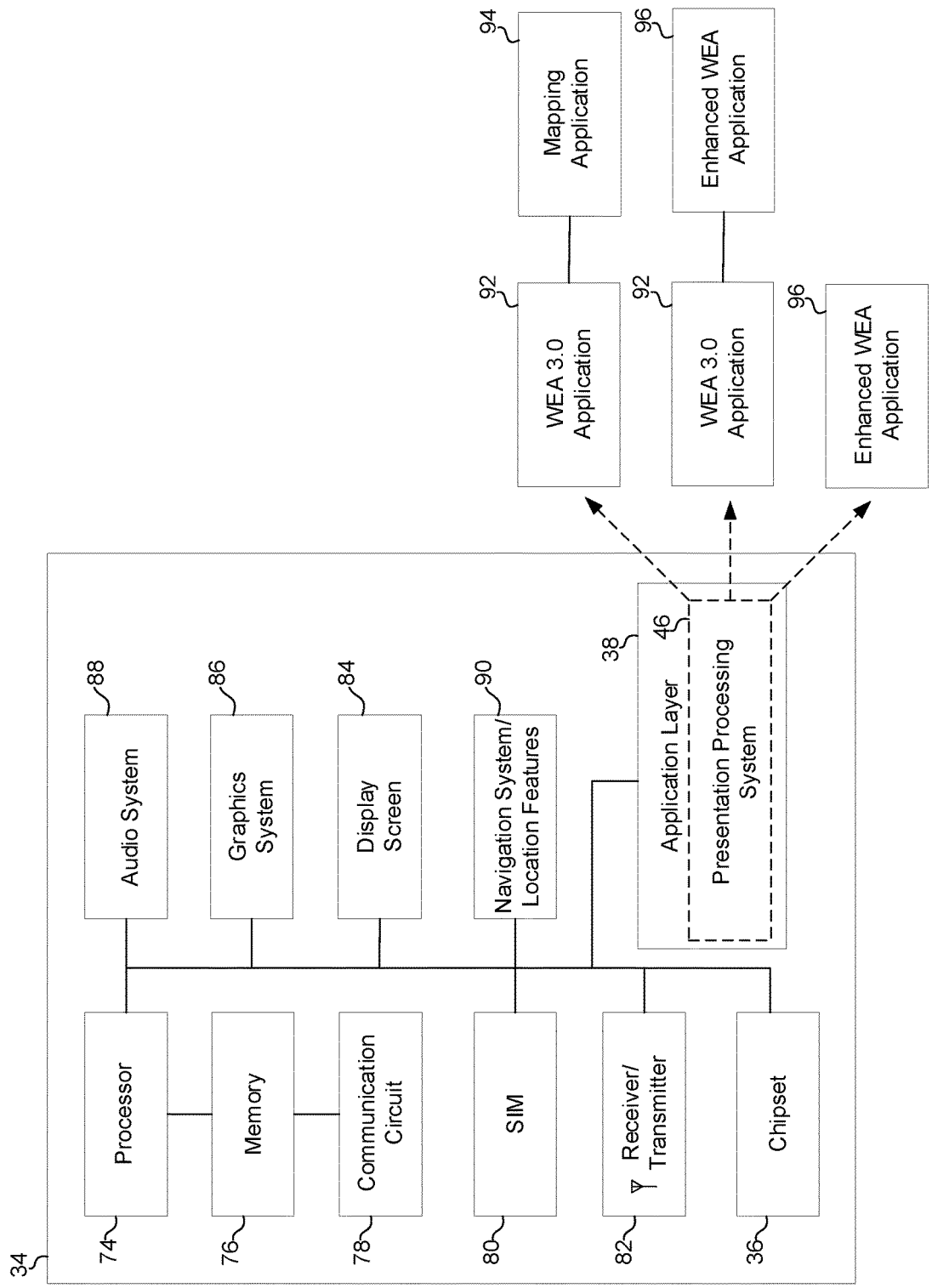
FIG. 3 is a schematic representation of certain components of a computer system of the vehicle of FIG. 2, according to one embodiment.

Certain components of the vehicle corn puter system 34 involved in receiving, processing, and presenting the WEA are shown in FIG. 3. The computer system 34 may include a processor 74 configured according to computer-executable instructions for receiving, intelligently processing, and presenting the WEA as described above. A memory 76 may be configured to store data and assist the processor 74, and a communication circuit 78 may be involved in receiving and transmitting data over the wireless communication network and over other communication networks such as the Internet. The computer system 34 may include a dedicated subscriber identity module (SIM) 80 for authenticating the vehicle 12 for independently receiving data over the wireless communication network 14.

The processor 74 may be in communication with a receiver/transmitter 82 involved in receiving the WEA broadcast, and converting wireless signals into digital data and vice versa. The WEA broadcast may be pulled into the chipset 36 and processed and presented via the presentation processing system 46 as described above in relation to FIG. 2. The presentation processing system 46 may be in communication with several vehicle computer components that assist in processing and presenting the WEA. Such components may include the display screen 84, a graphics system 86 for providing graphics at the display screen 84 such as maps or other visuals pertaining to the WEA, and an audio system 88 including a speaker for presenting alerts as audible sounds and/or audible verbal alerts. Additionally, the presentation processing system 46 may be in communication with a vehicle navigation system 90 which provides maps and driving directions via the display screen 84, and may include location features such as, but not limited to, a global positioning system (GPS), triangulation features, and Bluetooth beacon location features.

In some embodiments, the presentation processing system 46 may include a basic WEA 3.0 application 92 that processes the alert broadcast, and applies device-based geofencing to determine whether the vehicle 12 is within the alert area and should present the alert. The WEA 3.0 application 92 may interface with a pre-existing mapping application 94 on the computer system 34 which constructs the map, displays the map, and determines and provides the routes to safety. The mapping application 94 may be part of the vehicle navigation system 90. In other embodiments, the WEA 3.0 application 92 may interface with an enhanced WEA application 96 which provides the mapping features and routes to safety. In yet other embodiments, the enhanced WEA application 96 may be a single application that combines the functions of the basic WEA 3.0 application 92 and a mapping application.

Figure 4:
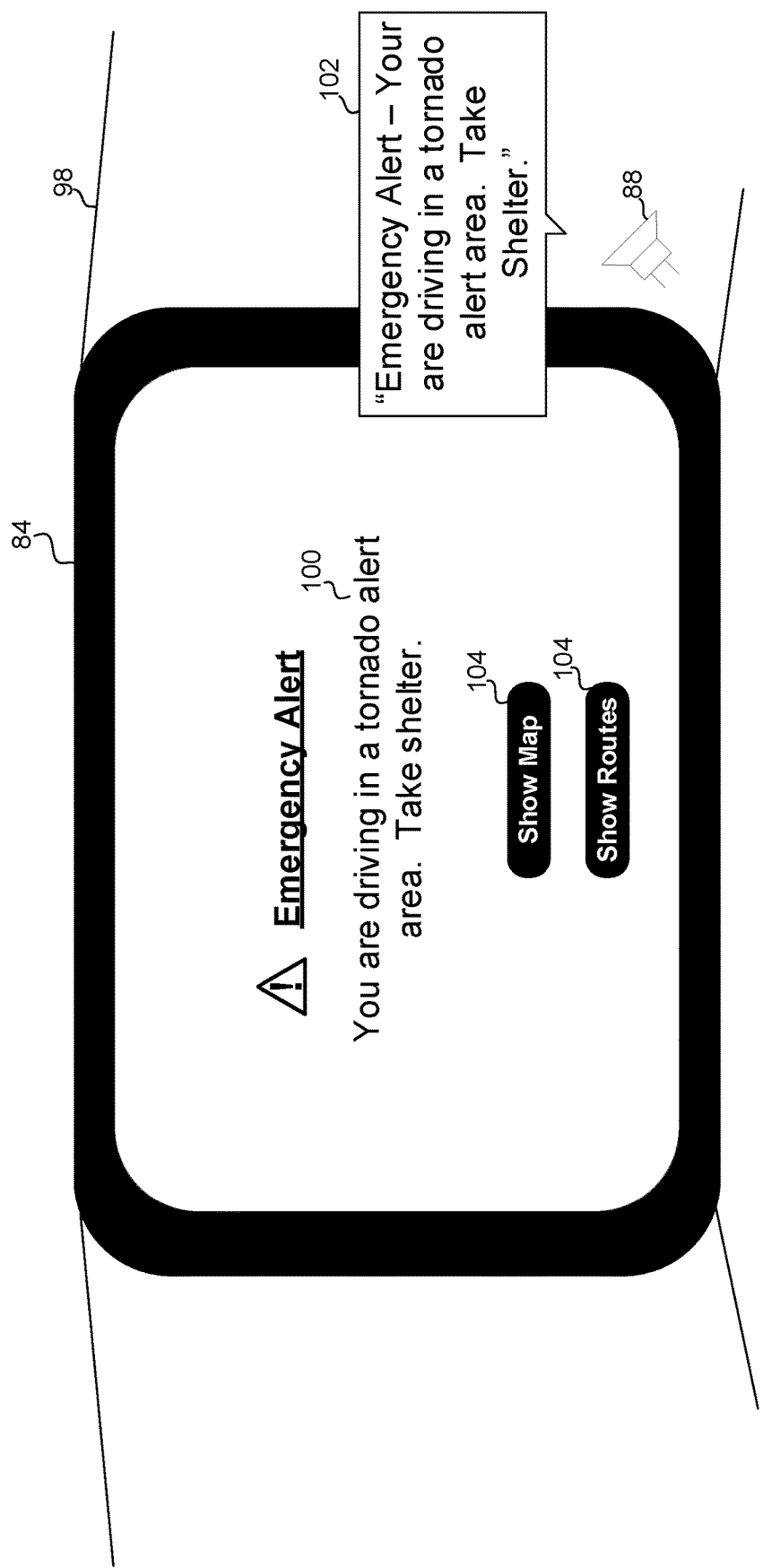
FIG. 4 is a schematic representation of presentation of an alert as a text alert at a display screen of the vehicle, and as an audible verbal alert, according to one embodiment.

A presentation of an exemplary alert at the display screen 84 of the vehicle 12 is shown in FIG. 4. The display screen 84 may be at a dashboard 98 of the vehicle 12, or at another location viewable by the driver. As shown, the emergency alert may be presented as a text alert 100 which may appear on the display screen 84, or override a current display at the display screen 84. The text alert 100 may indicate the type of alert, and provide an indication that the vehicle is in or near the alert area(s). Alternatively, or in addition to this, the alert may be presented as an audible verbal alert 102 or as an audible sound alert via the audio system 88. In some embodiments, the alert may be presented without the map of the alert area, and selection options 104 may be available at the display screen 84 to view the map of the alert area(s) as well as driving routes away from the alert area(s). Additionally, or alternatively, the vehicle computer system 34 may accept verbal (voice) commands to view the map and/or routes to safety.

Figure 5:
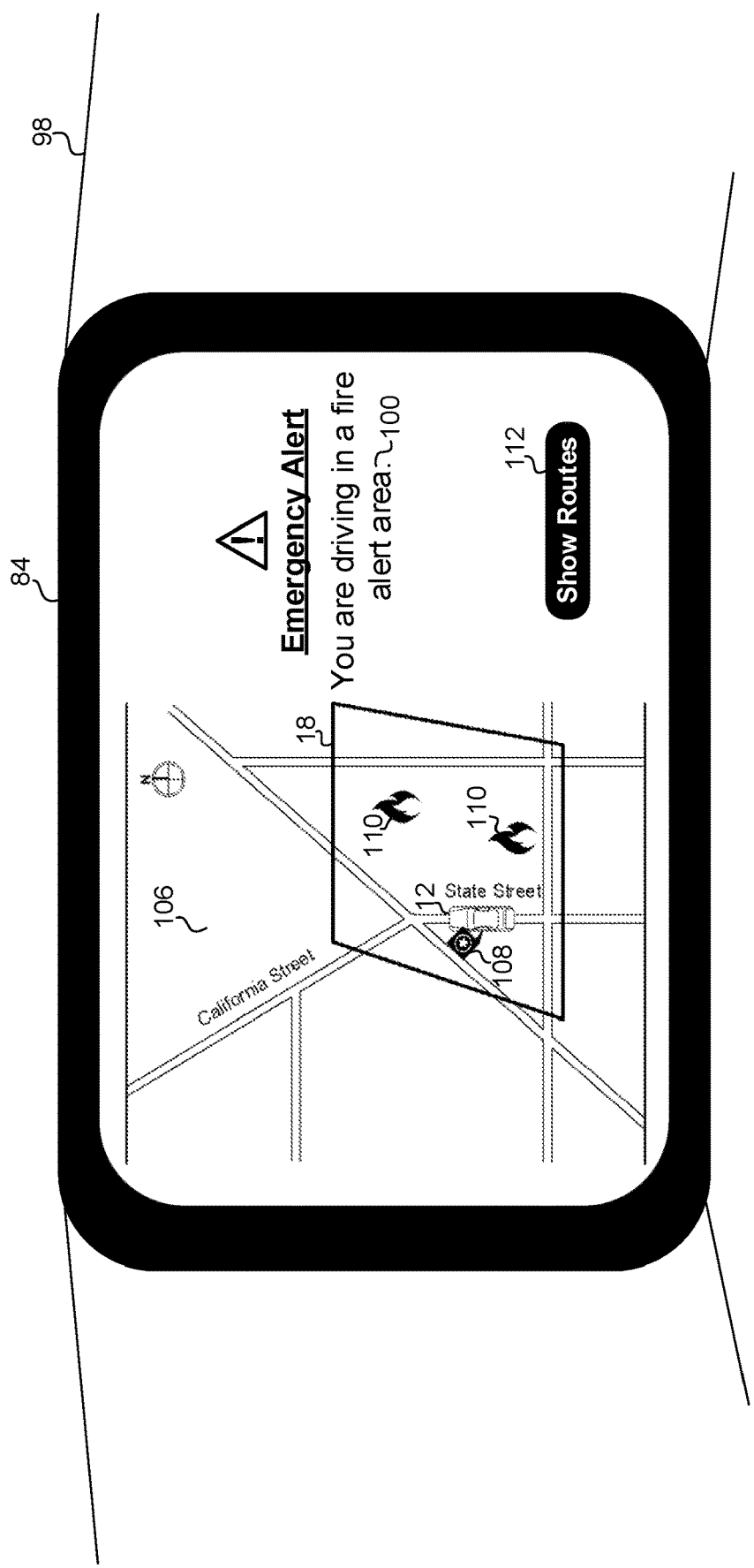
FIG. 5 is an exemplary display screen of the vehicle including the text alert and a map indicating a location of the vehicle with respect to an alert area associated with the wireless emergency alert, according to one embodiment.

An exemplary map 106 as provided at the display screen 84 is shown in FIG. 5. The map 106 may indicate the alert area(s) 18 with respect to surrounding geographical areas, as well as a current location 108 of the vehicle 12 with respect to the alert area(s) 18. If a driving direction map was in use at the display screen 84 prior receiving the WEA, the map of the alert area(s) 18 may be overlaid with the driving direction map to illustrate the direction the vehicle is heading with respect to the alert area(s) 18. The alert area(s) 18 may be colored differently, highlighted, or otherwise distinguished from the surrounding areas on the map 106. The map 106 may also include symbols 110 corresponding to the type of alert, such as tornado, hurricane, or fire symbols, for quick reference by the driver. In some embodiments, the location of the symbols 110 may correlate with the actual location of the hazards, if such locations are received in the WEA broadcast or otherwise available to the computer system 34. In some embodiments, the location of the symbols 110 on the map 106 may be updated periodically or in real time to allow the driver to track the vehicle's location with respect to the hazard, such as a tornado, as the hazard changes position.

In some embodiments, the map 106 may appear on the display screen 84 automatically, or may be integrated with a driving direction map if the vehicle navigation system 90 was in use at the display screen 84 when the WEA was received. In other embodiments, the map 106 may be displayed after a selection is made to view the map, such as with the selection options 104 at the display screen 84 (also see FIG. 4) or with verbal (voice) commands. An alert associated with the alert area(s) 18 may be presented along with the map 106 as a text alert 100, an audible verbal alert 102 (also see FIG. 4), or an audible sound alert. Furthermore, a selection option 112 to show driving directions or routes to safety may be provided at the display screen 84.

Figure 6:
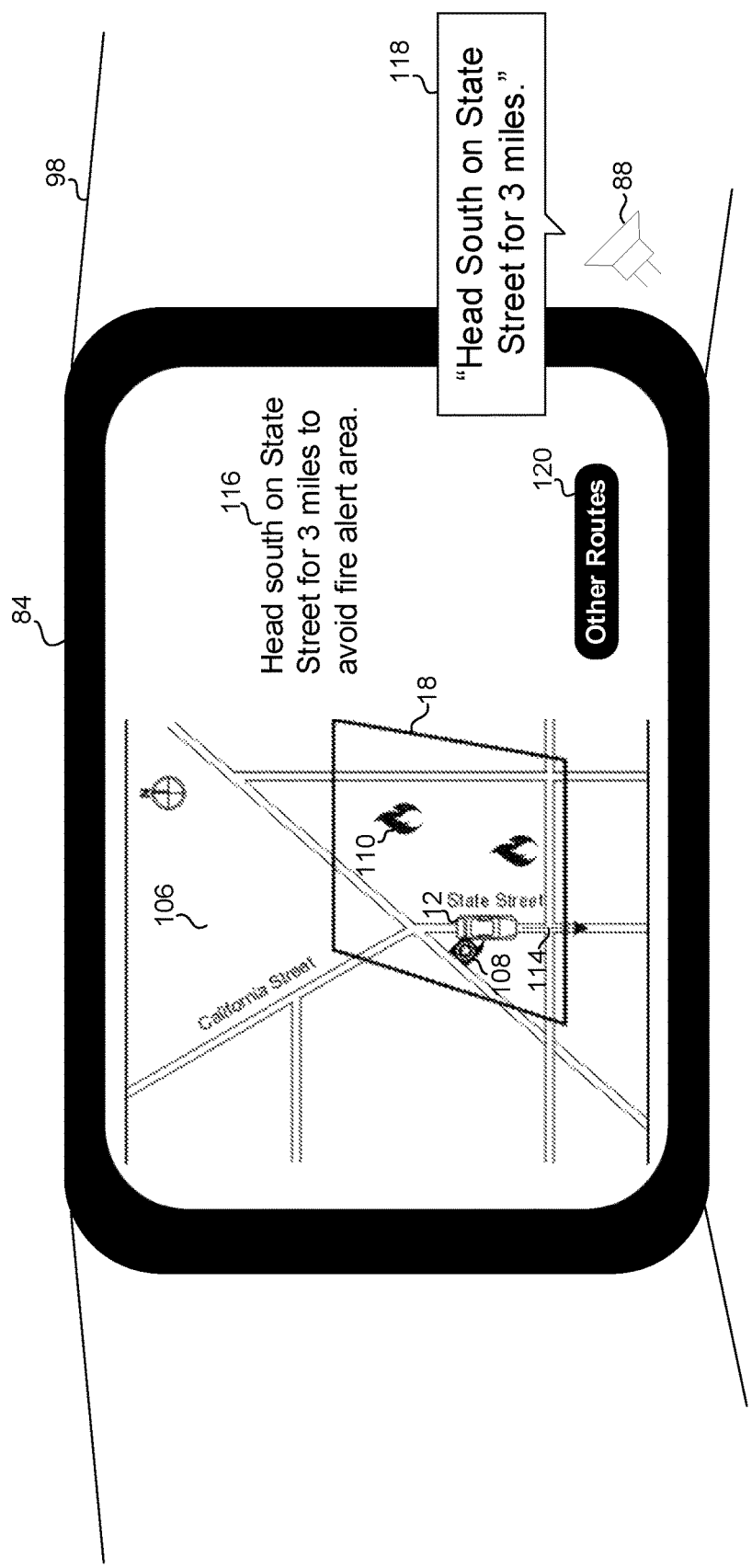
FIG. 6 is an exemplary display screen similar to FIG. 5 and including a driving route away from the alert area, according to one embodiment.

Turning to FIG. 6, one or more driving routes 114 to guide the vehicle 12 out of the alert area(s) 18 and to safety may be shown on the map 106. The route(s) 114 may be displayed as arrows indicating driving directions for the driver to follow out of the alert area(s) 18. Additionally, or alternatively, the route(s) 114 may be provided as a text description 116, or as an audible verbal description 118. In some embodiments, an audible verbal description 118 may be provided when the vehicle 12 is in driving mode so that the driver may be freed from reading the display screen 84 while driving. In some embodiments, the route(s) 114 may direct the vehicle 12 to a selected destination in a safe and/or quick manner that avoids the alert area(s) 18. In yet other embodiments, the route(s) 114 may provide instructions for staying out of the alert area(s) 114 if the vehicle 12 is within a predetermined distance (e.g., 0.1 mile) of an outer boundary of the alert area(s) 18. A selection option 120 to view alternative routes may also be provided at the display screen 84. The vehicle computer system 34 may also accept verbal commands to view alternative routes to safety. The driver or other user of the vehicle 12 may customize the presentation of the routes at the display screen 84 via an interface the allows selection of a preference for ranking the routes that are displayed (e.g., safest, shortest, etc.), and a desired destination, for example.

Figure 7:
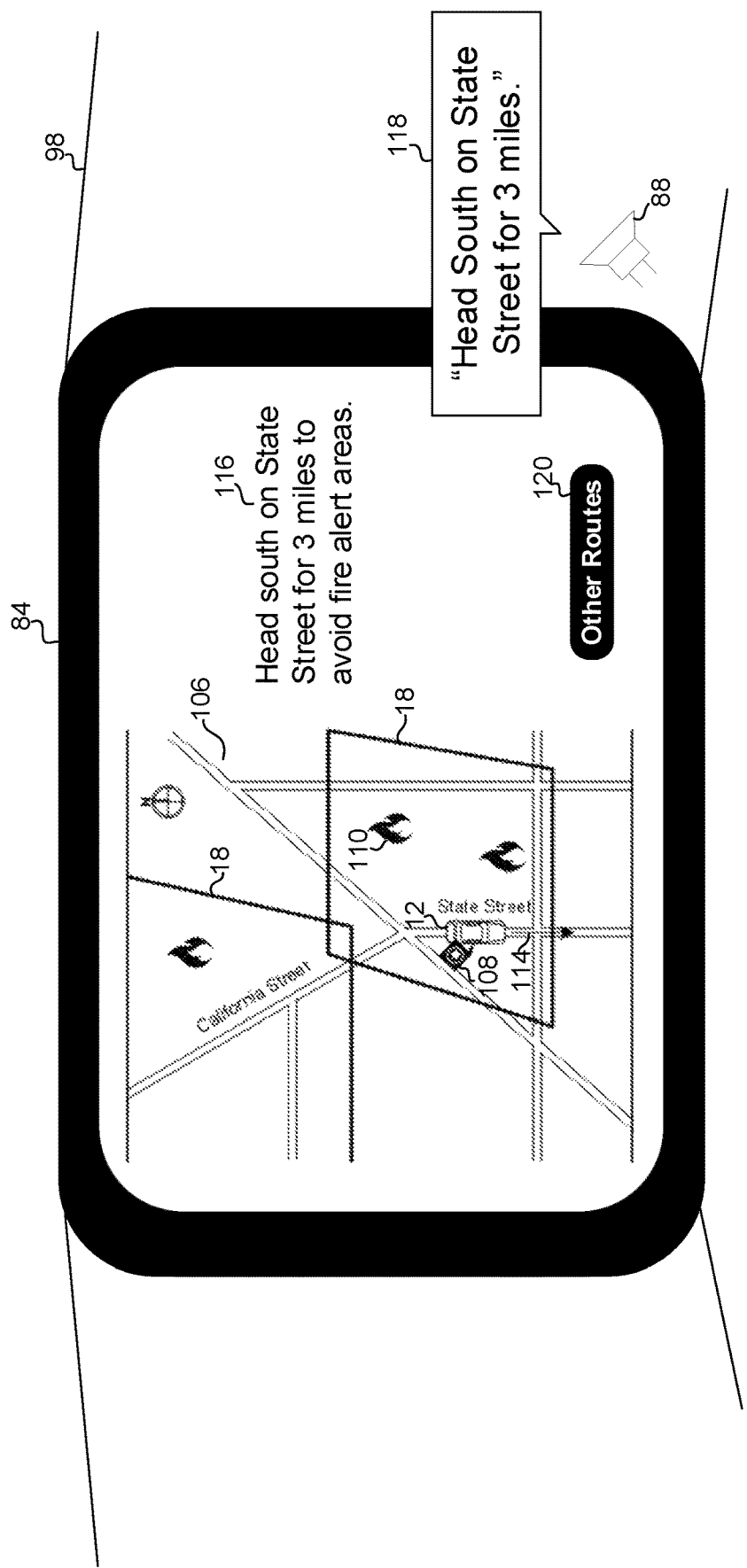
FIG. 7 is an exemplary display screen similar to FIG. 6 and including a driving route away from multiple alert areas, according to one embodiment.

In some circumstances, the WEA broadcast may include coordinates for multiple shapes (e.g., circles, polygons, etc.) defining different alert areas which may or may not overlap and may complicate the vehicle's path to safety. In these situations, the presentation processing system 46 may apply the coordinates of the different alert areas to generate a map 106 of the multiple alert areas 18 to show that driving in certain directions may bring the vehicle 12 out of one alert area 18 but into another (see FIG. 7). The different alert areas 18 may be associated with the same type of alert, or different types of alerts. If certain alert areas 18 are overlapping, the presentation processing system 46 may combine the overlapping alert areas into a larger alert area on the map 106. For example, with reference to FIG. 7, the two alert areas 18 are shown as overlapping separate alert areas, but may also be displayed as a single, combined alert area. When viewing the map 106, it may be seen that driving Northwest on California Street may bring the vehicle 12 out of one alert area 18 but into another. The presentation processing system 46 may display one or more routes 114 on the map 106 to guide the vehicle 12 away from all of the alert areas 18 and into safety. A text description 116 of the routes 114 may also be provided at the display screen 84. Additionally or alternatively, an audible verbal description 118 of the route(s) 114 may be provided via the audio system 88.

Figure 8:
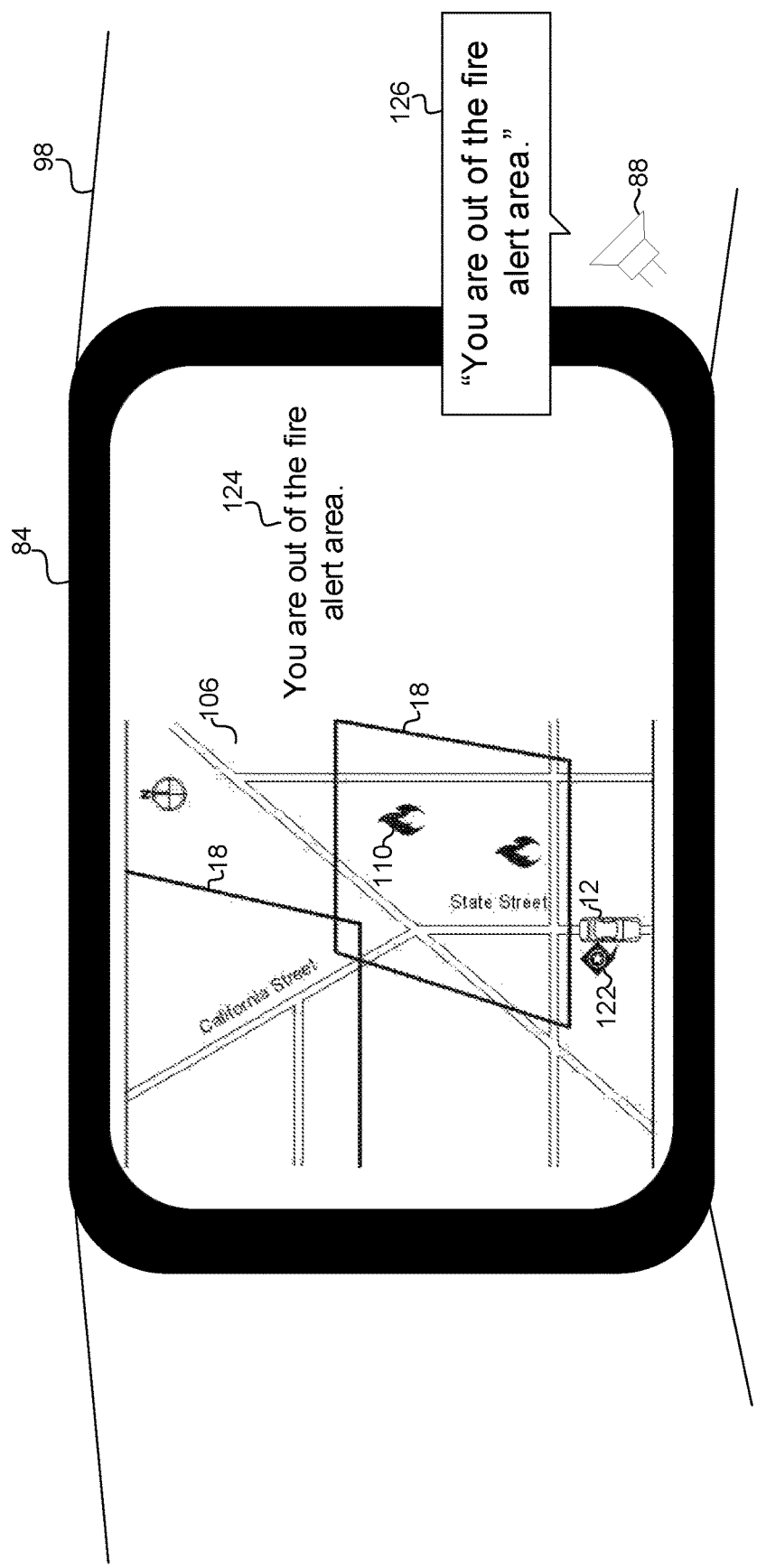
FIG. 8 is an exemplary display screen similar to FIG. 7 and including indications that the vehicle has moved out of the alert areas, according to one embodiment.

Referring to FIG. 8, the presentation processing system 46 may apply the vehicle navigation system 90 and the mapping functionality of the vehicle computer system 34 to track the position of the vehicle 12, and provide an indication on the map 106 when the vehicle 12 has moved out of the alert area(s) 18, is moving away from the alert area(s) 18, or is approaching the alert area(s) 18. The indication may be provided as a visual indication 122, a text indication 124 at the display screen 84, an audible verbal indication 126, or other audible sound indication. In some embodiments, the location of the vehicle 12 with respect to the alert area(s) 18 may be tracked and displayed on the map 106 in real time. Text or audio indications indicating whether the vehicle 12 is moving away from, approaching, or has moved out of the alert area 18 may also be provided in real time.

Figure 9:
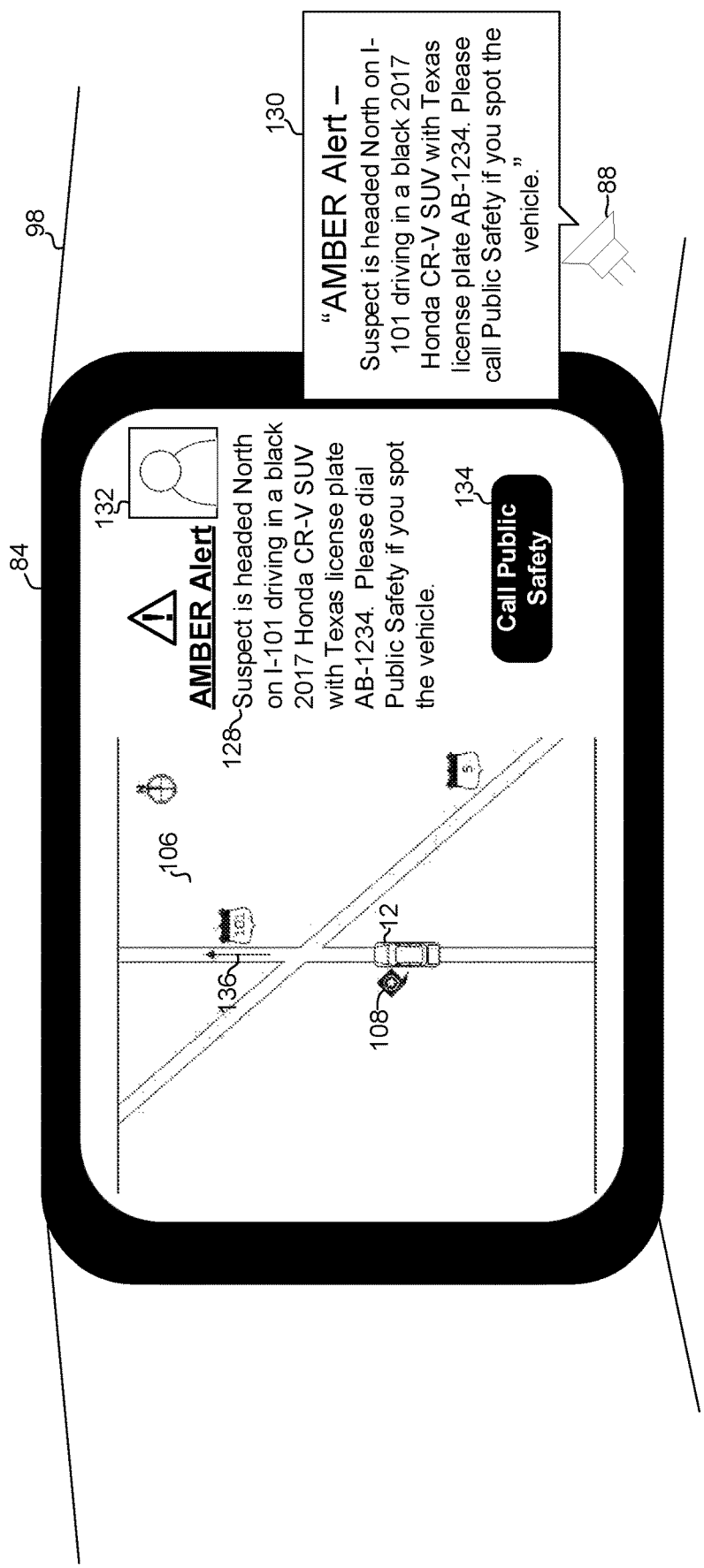
FIG. 9 is an exemplary display screen of the vehicle displaying an AMBER alert and a map showing a driving direction of a suspect with respect to the vehicle, according to one embodiment.

An exemplary AMBER alert provided at the display screen 84 is shown in FIG. 9. The AMBER alert may be provided as a text alert 128 or an audible verbal alert 130 via the audio system 88. The AMBER alert may include a picture 132 of the child and/or the suspect, and/or a description of the child and/or the suspect. If the information is available, the AMBER alert may also include a driving direction of the suspect and/or a license plate number of the suspect's vehicle. A request to respond with information may also be included in the alert. As a non-limiting example, the alert may include a request to call authorities if the suspect's vehicle is spotted, and a link 134 may be provided via the display screen 84 to facilitate dialing the authorities directly from the vehicle 12. The driver may also make a verbal command to dial the authorities in some embodiments. A map 106 may also be provided at the display screen 84 indicating the current location 108 of the vehicle 12 and a travel direction 136 of the suspect's vehicle if the travel direction of the suspect's vehicle is known.

Figure 10:
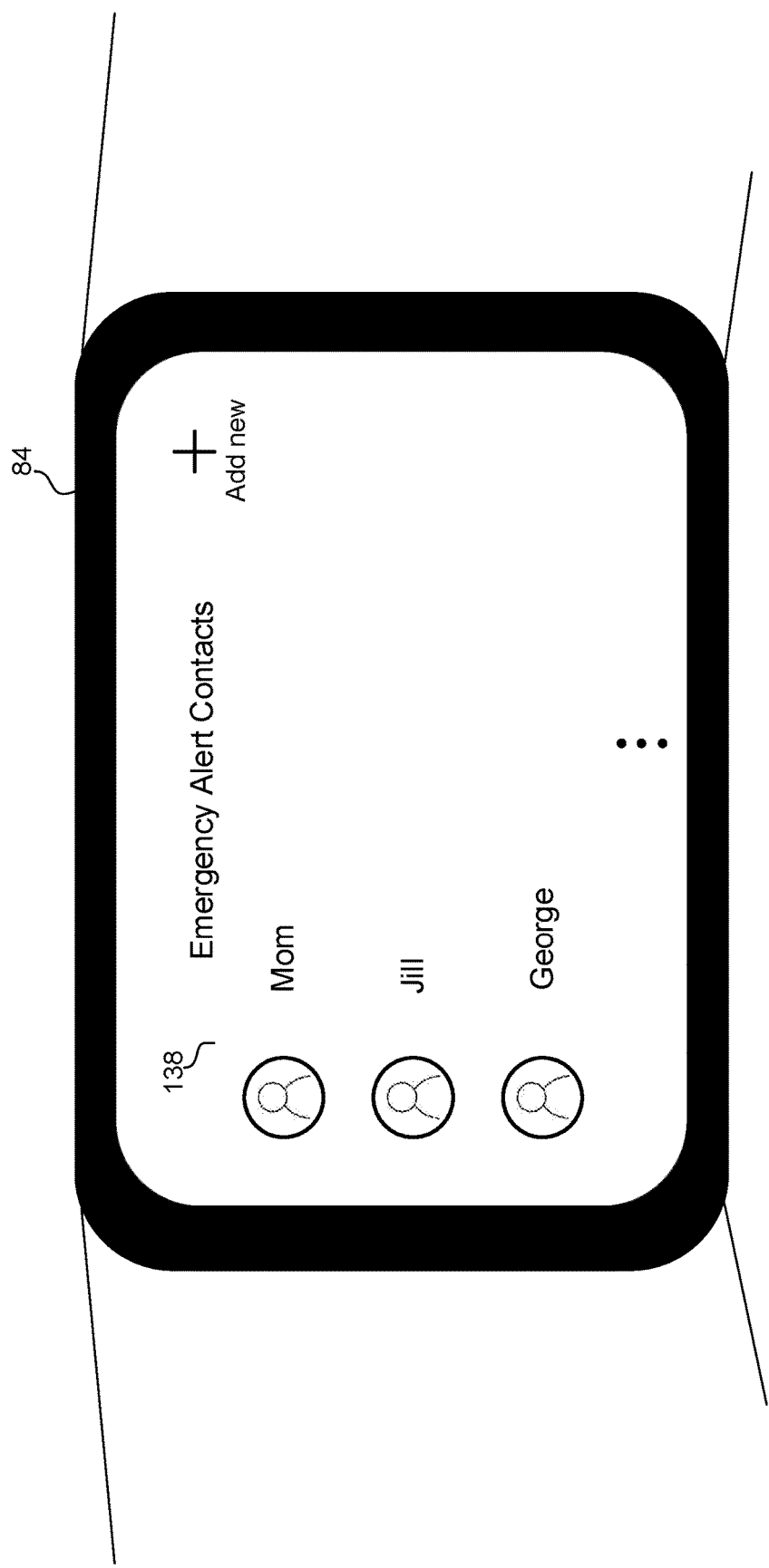
FIG. 10 is an exemplary display screen of the vehicle displaying an emergency contact list, according to one embodiment.
Figure 11:
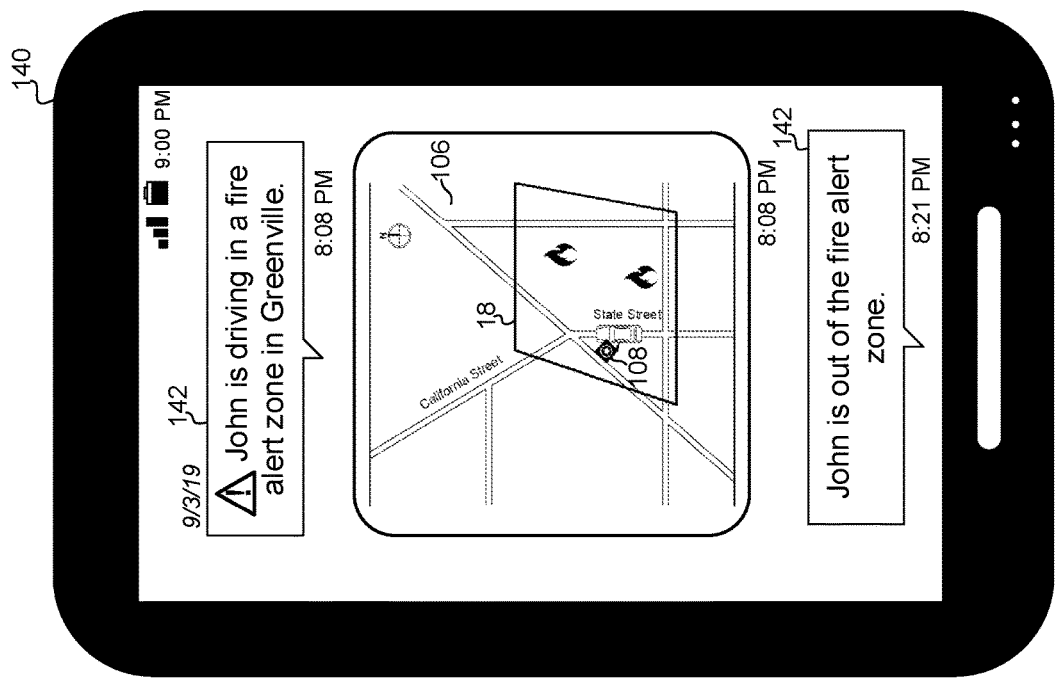
FIG. 11 is an exemplary display interface of a contact's mobile device providing a notification that the vehicle is driving in an alert area, according to one embodiment.

Referring to FIG. 10, a driver or other user of the vehicle 12 may create an emergency contact list 138, specifying contacts (e.g., friends, family) the driver or user of the vehicle 12 would like to notify when the vehicle 12 is within or near an emergency alert area. The vehicle 12 may transmit the notification to the selected contacts over the wireless communication network 14 when the vehicle 12 is within or near an emergency alert area. An exemplary notification sent to a mobile device 140 of a contact is shown in FIG. 11. The notification may be sent as a text message 142 or a voice message. In some embodiments, the map 106 showing the location 108 of the vehicle 12 with respect to the alert area(s) 18 may be sent with the text message 142 or as a separate text message. In some embodiments, text and/or map updates indicating any changes in the vehicle's location may be sent to the selected contacts periodically. A notification, such as a text message 142 or voice message, may also be sent to the contact's mobile device 140 when the vehicle 12 has reached safety or when the alert has come to an end.

The present disclosure provides an improvement in vehicle computer systems by enabling vehicle computer systems to autonomously receive, intelligently process, and present wireless emergency alerts without connection to a separate device. The vehicle may be a standalone mobile device that includes a chipset and an application layer allowing the vehicle to receive, process, and present the WEA broadcast. As opposed to many mobile devices, the vehicle may have a larger display screen to facilitate viewing of the emergency alert and improve safety. As the geographical coordinates of the alert area(s) are now communicated in WEA 3.0 as of the end of 2019, the geographical information may be processed by applying existing or enhanced vehicle navigation systems and mapping applications of the vehicle computer system to provide additional safety information such as, but not limited to, the vehicle's location with respect to the alert area(s), the vehicle's driving direction with respect to the alert area(s), directions away from the alert area(s), either simply exiting the alert area(s) or moving toward a specified destination, and driving directions of any suspects involved in the alert. The audio system on the vehicle may be used to provide audible alerts and instruct the driver away from the alert area without the need for the driver to view the display screen while driving, enhancing the safety of the passengers. Furthermore, the vehicle navigation and location features on the vehicle may track the vehicle's location with respect to the alert area(s) and provide visual or audible indications of when the user is approaching or moving away from the alert area(s). The ability to present alert information to the driver as an audible message or sound via the vehicle audio system may encourage drivers to pay attention to certain types alerts (e.g., AMBER alerts) which may otherwise be ignored by the driver while driving. The vehicle may also present the emergency alert with a request to respond with information pertaining to the alert and links to facilitate response, as may be useful to authorities for certain types of alerts (e.g., AMBER alerts).

What is claimed is:

1. A non-transitory computer readable medium for storing instructions for:
   receiving, at a computer system of a vehicle, a wireless emergency alert over a wireless communication network, the wireless emergency alert including an alert message and geographical coordinates defining one or more alert areas associated with the wireless emergency alert;
   determining whether the driver of the vehicle has opted out of receiving the wireless emergency alert;
   if the driver has not opted out of receiving the wireless emergency alert, applying the geological coordinates to construct the one or more alert areas;
   comparing, via the vehicle computer system of the vehicle, a current location of the vehicle with the geographical coordinates to determine whether the vehicle is within or near the one or more alert areas defined by the geographical coordinates; and
   if the vehicle is within or near the one or more alert areas, generating, via the computer system of the vehicle, a map that illustrates the current location of the vehicle with respect to the one or more alert areas;
   displaying, via the computer system of the vehicle, the map at a display screen of the vehicle;
   creating, via the computer system of the vehicle, a notification that the vehicle is within or near the one or more alert areas, and
   transmitting, over the wireless communication network, the notification to one or more user devices of contacts provided in a contact list, wherein the contacts are selected and added to the contact list by a driver of the vehicle.

2. The non-transitory computer readable medium of claim 1, wherein generating the map comprises:
   constructing a first map of the alert area(s) based on the coordinates; and
   merging the first map with a second map of the current location of the vehicle.

3. The non-transitory computer readable medium of claim 1, wherein generating the map comprises:
   constructing a first map of the one or more alert areas based on the coordinates; and merging the first map with a second map including the current location of the vehicle and a driving direction of the vehicle.

4. The non-transitory computer readable medium of claim 1, wherein displaying the map comprises overriding a current display at the display screen with the map.

5. The non-transitory computer readable medium of claim 1, wherein displaying the map comprises overlaying a first map of the one or more alert areas on a second map illustrating a current location of the vehicle and a driving direction of the vehicle.

6. The non-transitory computer readable medium of claim 1, wherein if the vehicle is within or near the one or more alert areas, storing instructions for:
   applying a mapping application or other application associated with the computer system of the vehicle to determine one or more driving routes away from the one or more alert areas; and
   displaying the one or more driving routes away from the one or more alert areas on the map.

7. The non-transitory computer readable medium of claim 6, further storing instructions for:
   providing an audible, verbal description of the one or more driving routes away from the one or more alert areas via an audio system of the vehicle.

8. The non-transitory computer readable medium of claim 6, further storing instructions for:
   providing a text description of the one or more driving routes away from the one or more alert areas at the display screen.

9. The non-transitory computer readable medium of claim 1, wherein if the vehicle is within or near the alert area(s), storing instructions for:
   monitoring, via the computer system, changes in the current location of the vehicle with respect to the one or more alert areas, and providing, via the computer system of the vehicle, an indication of whether the vehicle is approaching or moving away from the one or more alert areas based on the changes in the current location, wherein the indication is provided as one or more of a visual indication on the map, a text indication, and an audible, verbal indication.

10. The non-transitory computer readable medium of claim 1, wherein, if the vehicle is within or near the one or more alert areas, storing instructions for:
    presenting, via the computer system of the vehicle, the alert message as one or more of a text alert at the display screen, a sound alert via an audio system of the vehicle, and an audible, verbal alert via the audio system.

11. A non-transitory computer system for processing and presenting a wireless emergency alert at a vehicle, comprising:
    a wireless communication network configured to broadcast the wireless emergency alert, the wireless emergency alert including an alert message and geographical coordinates defining one or more alert areas associated with the wireless emergency alert; and
    a computer system of the vehicle including a processor, a memory, and a communication circuit in communication with the wireless communication network, the processor being configured according to computer-executable instructions for:
    autonomously receiving the wireless emergency alert over the wireless communication network,
    determining whether the driver of the vehicle has opted out of receiving the wireless emergency alert;
    if the driver has not opted out of receiving the wireless emergency alert, applying the geological coordinates to construct the one or more alert areas;
    comparing a current location of the vehicle with the geographic coordinates to determine whether the vehicle is within or near the one or more alert areas defined by the geographical coordinates, and
    if the vehicle is within or near the one or more alert areas,
    generating, via the computer system of the vehicle, a map that illustrates the current location of the vehicle with respect to the one or more alert areas;
    displaying, via the computer system of the vehicle, the map at a display screen of the vehicle;
    creating, via the computer system of the vehicle, a notification that the vehicle is within or near the one or more alert areas, and
    transmitting, over the wireless communication network, the notification to one or more user devices of contacts provided in a contact list, wherein the contacts are selected and added to the contact list by a driver of the vehicle.

12. The system of claim 11, wherein, if the vehicle is within or near the one or more alert areas, the processor is further configured according to computer-executable instructions for:
    determining one or more driving routes for the vehicle to drive away from the one or more alert areas, and
    displaying the one or more driving routes away from the one or more alert areas on the map.

13. The system of claim 12, wherein the processor is further configured according to computer-executable instructions for:
    providing an audible, verbal description of the one or more driving routes away from the one or more alert areas via an audio system of the vehicle.

14. The system of claim 12, wherein the processor is further configured according to computer-executable instructions for:
    providing a text description of the one or more routes away from the one or more alert areas at the display screen.

15. The system of claim 11, wherein, if the vehicle is within or near the one or more alert areas, the processor is further configured according to computer-executable instructions for:
    monitoring changes in the current location of the vehicle with respect to the one or more alert areas, and providing an indication of whether the vehicle is approaching or moving away from the one or more alert areas based on the changes in the current location, wherein the indication is provided as one or more of a visual indication on the map, a text indication, and an audible, verbal indication.

16. The system of claim 11, wherein the computer system of the vehicle includes a chipset configured to receive and read the wireless emergency alert, and an application layer configured to process and present the wireless emergency alert.

17. The system of claim 11, wherein, if the vehicle is within or near the one or more alert areas, the processor is further configured according to computer-executable instructions for:
    presenting the alert message as one or more of a text alert at the display screen, a sound alert via an audio system of the vehicle, and an audible, verbal alert via the audio system.

18. The system of claim 17, wherein the alert message includes a request for the driver to respond with information pertaining to the wireless emergency alert.

* * * * *